United States Patent
Small (10) Patent No.: US 9,134,827 B2
(45) Date of Patent: Sep. 15, 2015

(54) SYSTEM AND METHOD FOR MATHEMATICALLY INDEPENDENT SIGNALING IN GRADIENT SENSOR DEVICES

(75) Inventor: Jeffrey A. Small, Rochester, NY (US)

(73) Assignee: Synaptics Incorporated, San Jose, CA (US)

( * ) Notice: Subject to any disclaimer, the term of this patent is extended or adjusted under 35 U.S.C. 154(b) by 582 days.

(21) Appl. No.: 13/339,125

(22) Filed: Dec. 28, 2011

(65) Prior Publication Data

US 2013/0169581 A1 Jul. 4, 2013

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01)

(58) Field of Classification Search
CPC ..... G06F 3/044; G06F 3/0412; G06F 3/0416; G06F 3/045
See application file for complete search history.

(56) References Cited

U.S. PATENT DOCUMENTS

| | | | |
|---|---|---|---|
| 4,087,625 A | 5/1978 | Dym et al. | |
| 4,353,552 A * | 10/1982 | Pepper, Jr. | 463/37 |
| 5,650,597 A | 7/1997 | Redmayne | |
| 5,841,078 A | 11/1998 | Miller et al. | |
| 6,278,444 B1 | 8/2001 | Wilson et al. | |
| 6,288,707 B1 | 9/2001 | Philipp | |
| 6,879,930 B2 | 4/2005 | Sinclair et al. | |
| 7,030,860 B1 | 4/2006 | Hsu et al. | |
| 7,265,686 B2 | 9/2007 | Hurst | |
| 7,355,592 B2 | 4/2008 | Hong et al. | |
| 7,382,139 B2 | 6/2008 | Mackey | |
| 7,423,635 B2 | 9/2008 | Taylor et al. | |
| 7,737,953 B2 | 6/2010 | Mackey | |
| 7,808,255 B2 | 10/2010 | Hristov et al. | |
| 8,248,383 B2 | 8/2012 | Dews et al. | |
| 2004/0135775 A1 | 7/2004 | Hurst et al. | |
| 2005/0012644 A1 | 1/2005 | Hurst et al. | |
| 2005/0270040 A1 * | 12/2005 | Stridsberg | 324/662 |
| 2006/0097991 A1 | 5/2006 | Hotelling et al. | |
| 2007/0146349 A1 | 6/2007 | Errico | |
| 2007/0222763 A1 | 9/2007 | Spath | |
| 2007/0247443 A1 | 10/2007 | Philipp | |
| 2007/0257894 A1 | 11/2007 | Philipp | |
| 2008/0006453 A1 | 1/2008 | Hotelling | |

(Continued)

OTHER PUBLICATIONS

ISA/KR "International Search Report and Written Opinion" mailed Apr. 28, 2011 for International Appln. No. PCT/US2010/048319.

(Continued)

*Primary Examiner* — Gerald Johnson
(74) *Attorney, Agent, or Firm* — Osha Liang LLP (57) ABSTRACT

A processing system for an input device includes a transmitter module, a receiver module, and a determination module. The transmitter module is configured to simultaneously drive a first end of a transmitter electrode with a first drive signal and drive a second end of the transmitter electrode with a second drive signal to produce a voltage gradient across the transmitter electrode, wherein the first drive signal and the second drive signal are mathematically independent. The receiver module is configured to receive a resulting signal with a receiver electrode, the resulting signal comprising effects of the voltage gradient. The determination module is configured to determine positional information for an input object based on the resulting signal.

20 Claims, 5 Drawing Sheets

(56) References Cited

U.S. PATENT DOCUMENTS

| | | |
|---|---|---|
| 2008/0246496 A1 | 10/2008 | Hristov et al. |
| 2009/0091551 A1 | 4/2009 | Hotelling et al. |
| 2009/0194344 A1 | 8/2009 | Harley et al. |
| 2009/0267914 A1 | 10/2009 | Dews et al. |
| 2009/0277696 A1 | 11/2009 | Reynolds et al. |
| 2009/0322355 A1 | 12/2009 | Day et al. |
| 2010/0007625 A1 | 1/2010 | Jiang et al. |
| 2010/0045632 A1 | 2/2010 | Yilmaz et al. |
| 2010/0164889 A1 | 7/2010 | Hristov et al. |
| 2010/0214231 A1 | 8/2010 | D'Souza et al. |
| 2010/0258360 A1 | 10/2010 | Yilmaz |
| 2010/0321214 A1* | 12/2010 | Wang et al. ............ 341/20 |
| 2010/0328255 A1 | 12/2010 | Ishizaki et al. |
| 2011/0043478 A1 | 2/2011 | Matsushima |
| 2011/0048813 A1 | 3/2011 | Yilmaz |
| 2011/0050624 A1* | 3/2011 | Lee et al. ............ 345/174 |
| 2011/0062969 A1 | 3/2011 | Hargreaves et al. |
| 2011/0062974 A1* | 3/2011 | Day et al. ............ 324/713 |
| 2011/0267300 A1* | 11/2011 | Serban et al. ............ 345/174 |
| 2012/0056841 A1* | 3/2012 | Krenik et al. ............ 345/174 |
| 2012/0133614 A1* | 5/2012 | Bytheway et al. ............ 345/174 |
| 2012/0162122 A1* | 6/2012 | Geaghan ............ 345/174 |

OTHER PUBLICATIONS

United States Patent and Trademark Office, Non-Final Office Action mailed Sep. 6, 2012 for U.S. Appl. No. 12/847,598.

United States Patent and Trademark Office, US Non-final Office Action for U.S. Appl. No. 12/879,474, dated Dec. 28, 2012.

USPTO, Ex parte Quayle Office Action for U.S. Appl. No. 12/879,474, mailed May 15, 2013.

* cited by examiner

SYSTEM AND METHOD FOR MATHEMATICALLY INDEPENDENT SIGNALING IN GRADIENT SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Gradient sensors are sensors that employ a voltage variation across one or more electrodes (usually a transmitter electrode) to assist in determining positional information. While gradient sensors are advantageous in a number of respects, there remains a need for gradient sensors with improved noise immunity and faster sensing times.

BRIEF SUMMARY OF THE INVENTION

A processing system in accordance with one embodiment of the present invention includes a transmitter module including transmitter circuitry, a receiver module, and a determination module. The transmitter module is configured to simultaneously drive a first end of a transmitter electrode with a first drive signal and drive a second end of the transmitter electrode with a second drive signal to produce a voltage gradient across the transmitter electrode, wherein the first drive signal and the second drive signal are mathematically independent. The receiver module is configured to receive a resulting signal with a receiver electrode, the resulting signal comprising effects of the voltage gradient. The determination module is configured to determine positional information for an input object based on the resulting signal.

A capacitive sensor device in accordance with one embodiment includes a transmitter electrode, a receiver electrode, and a processing system communicatively coupled to the transmitter electrode and the receiver electrode. The processing system is configured to: simultaneously drive a first end of a transmitter electrode with a first drive signal and drive a second end of the transmitter electrode with a second drive signal to produce a voltage gradient across the transmitter electrode, wherein the first drive signal and the second drive signal are mathematically independent; receive a resulting signal with a receiver electrode, the resulting signal comprising effects of the voltage gradient; demodulate the resulting signal to produce a first demodulated signal based on the first drive signal, and a second demodulated signal based on the second drive signal; and determine positional information for an input object based on the first and second demodulated signals.

A method of capacitive sensing in accordance with one embodiment includes simultaneously driving a first end of a transmitter electrode with a first drive signal and driving a second end of the transmitter electrode with a second drive signal to produce a voltage gradient across the transmitter electrode, wherein the first drive signal and the second drive signal are mathematically independent; receiving a resulting signal with a receiver electrode, the resulting signal comprising effects of the voltage gradient; demodulating the resulting signal to produce a first demodulated signal based on the first drive signal, and a second demodulated signal based on the second drive signal; and determining positional information for an input object based on the first and second demodulated signals.

BRIEF DESCRIPTION OF DRAWINGS

The present invention will hereinafter be described in conjunction with the appended drawings, where like designations denote like elements, and.

DETAILED DESCRIPTION OF THE INVENTION

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Figure 1:
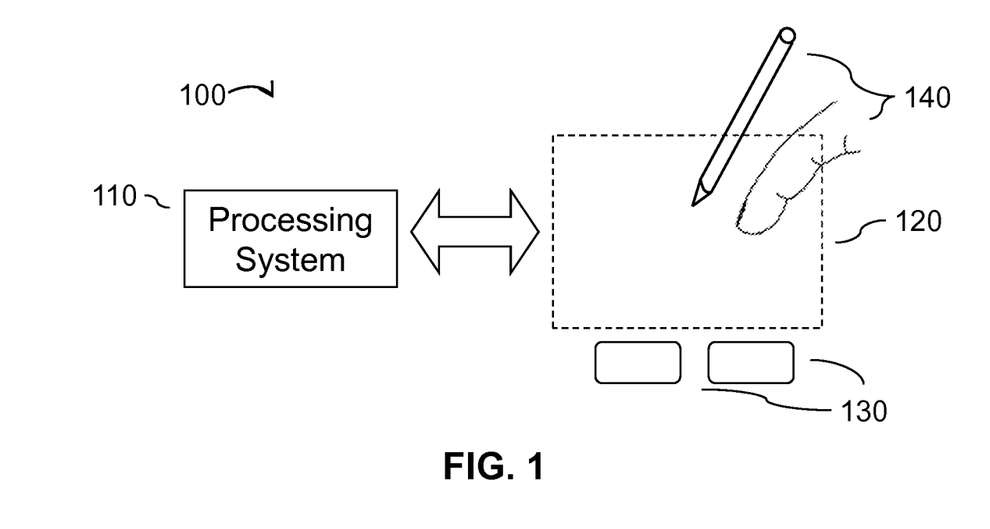
FIG. 1 is a block diagram of an example system that includes an input device in accordance with an embodiment of the invention.

Various embodiments of the present invention provide input devices and methods that facilitate improved usability. FIG. 1 is a block diagram of an example input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 2:
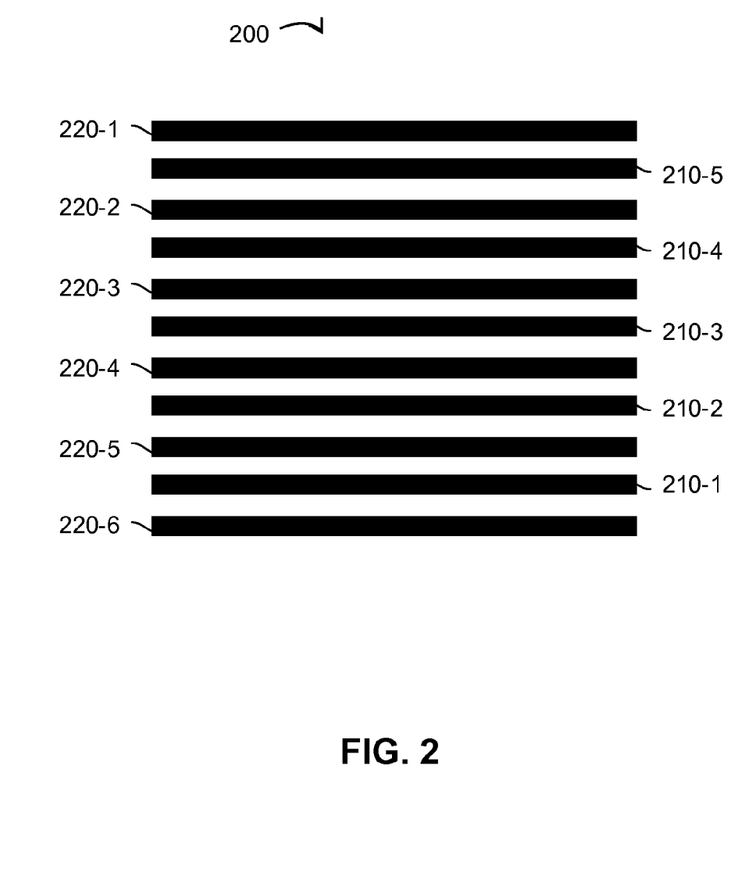
FIG. 2 is a conceptual block diagram depicting an example electrode pattern.
Figure 3:
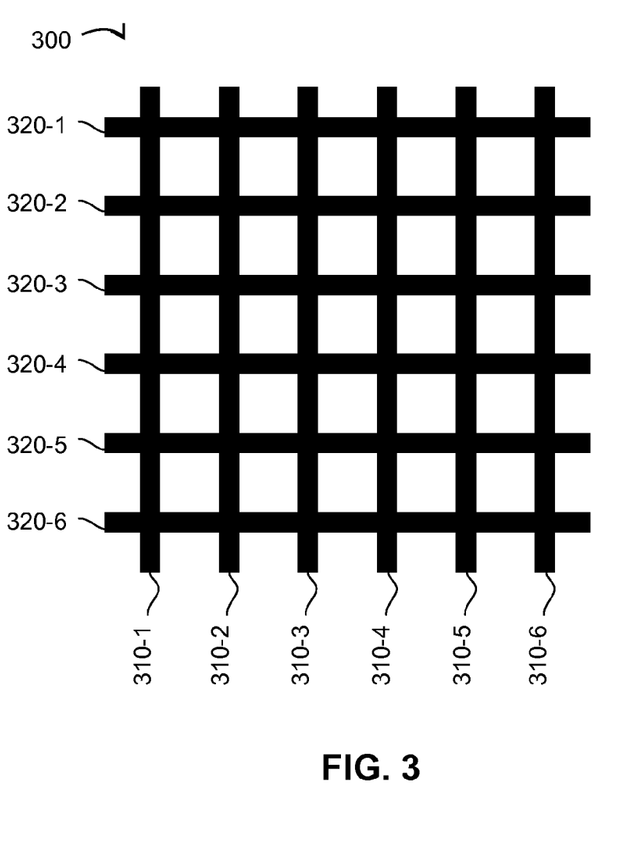
FIG. 3 is a conceptual block diagram depicting an example electrode pattern.

FIGS. 2 and 3 illustrate, conceptually, example sets of capacitive sensor electrodes 200 and 300 configured to sense in a sensing region. For clarity of illustration and description, FIG. 2 shows a pattern of sensor electrodes arranged substantially parallel to each other, and FIG. 3 shows a pattern of sensor electrodes arranged substantially perpendicular to each other. FIG. 2 and FIG. 3 illustrates two different forms of what may be referred to as a "gradient" sensors, in which a voltage variation is produced in the electrodes, as described in further detail below. The embodiment illustrated in FIG. 3 may further be referred to as what is often referred to as an "image" sensor, or a "gradient image sensor". It will be appreciated, however, that the invention is not so limited, and that a variety of electrode patterns and shapes may be suitable in any particular embodiment.

Sensor electrodes 210 and 220 of FIG. 2 are typically ohmically isolated from each other, as are sensor electrodes 310 and 320 of FIG. 3. In some embodiments, such sensor electrodes are separated from each by one or more substrates. For example, they may be disposed on opposite sides of the same substrate, or on different substrates that are laminated together.

In the embodiment depicted in FIG. 2, some sensor electrodes 210 (e.g., 210-1, 210-2, etc.) are configured as receiver electrodes, and some sensor electrodes 220 (e.g., 220-1, 220-2, etc.) are configured as transmitter electrodes. Similarly, in FIG. 3, some sensor electrodes 310 (e.g., 310-1, 310-2, etc.) are configured as receiver electrodes, and some sensor electrodes 320 (e.g., 320-1, 320-2, etc.) are configured as transmitter electrodes. The capacitive coupling between the transmitter electrodes and receiver electrodes change with the proximity and motion of input objects in the sensing region associated with the transmitter electrodes and receiver electrodes.

In each of the illustrated embodiments (as well as other example embodiments) the receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 (including, for example, the various sensor electrodes 200 and 300 of FIGS. 2 and 3) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional" positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 4:
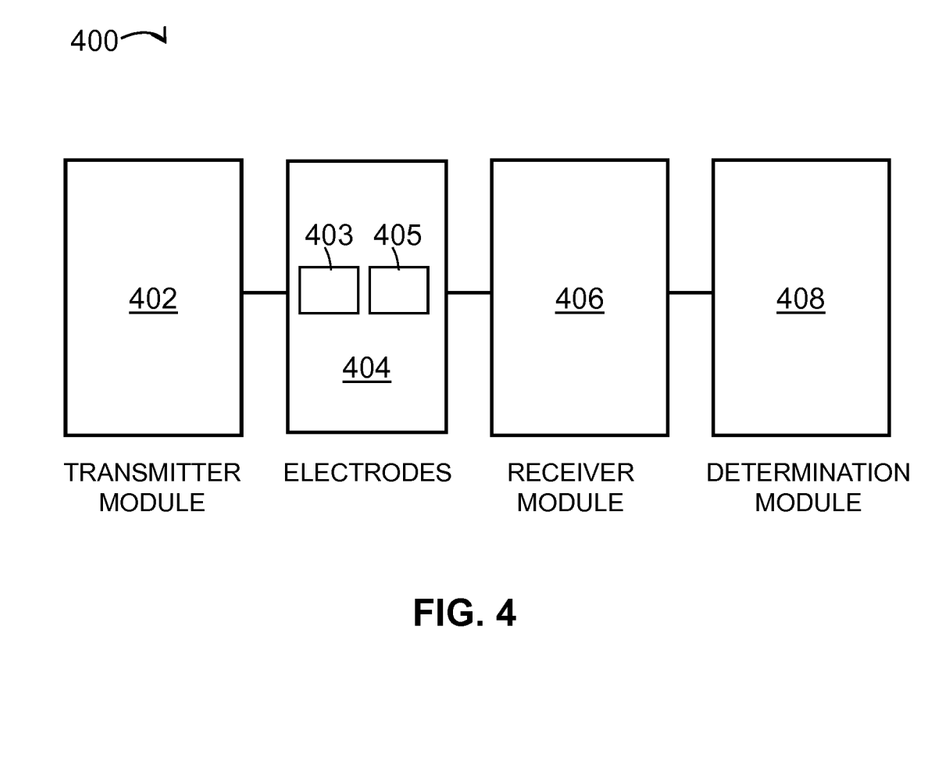
FIG. 4 is a conceptual diagram depicting an example processing system in accordance with the present invention.

Referring now to the conceptual block diagram depicted in FIG. 4, various embodiments of an example processing system 110 as shown in FIG. 1 may include a system 400. System 400, as illustrated, generally includes transmitter module 402 communicatively coupled via a set of sensor electrodes (or simply "sensor electrodes") 404 to receiver module 406, which itself is coupled to determination module 408. Sensor electrodes 404 include one or more transmitter electrodes 403 and one or more receiver electrodes 405. In one embodiment, sensor electrodes 404 may be constructed from opaque or substantially opaque conductive materials. In other embodiments sensor electrodes 404 can be constructed from transparent or substantially transparent conductive material, such as patterned ITO, ATO, carbon fiber nanotubes, or other substantially transparent materials. In one embodiment, transmitter electrodes 403 are constructed from a conductive material of substantially uniform resistivity, so that voltage variations can be imposed on it by the driving methods described below. In some embodiments, the conductive material may have non-uniform resistivity, such as having a higher or lower resistivity on the distal ends than in the middle portion. Other forms of non-uniform resistivity can also be implemented. In one embodiment, the voltage variations may be defined as the amount of change in voltage as a function of a small change in position along a transmitter electrode comprising resistive material.

Transmitter module 402 includes any combination of software and/or hardware (e.g., transmitter circuitry) configured to simultaneously drive one end (not shown) of one or more of the transmitter electrodes 403 with a first drive signal while driving another end (not shown) of those transmitter electrodes with a second drive signal such that the first drive signal and the second drive signal are mathematically independent. In this way, a voltage gradient is produced across the transmitter electrodes.

Receiver module 406 includes any combination of software and/or hardware (e.g., receiver circuitry) configured to receive one or more resulting signals with receiver electrodes 405, wherein the resulting signals comprise effects of the voltage gradient produced across transmitter electrodes 403. The term "gradient sensor" is thus used herein, without loss of generality, to refer to a sensor device employing one or more such voltage variations as described herein.

Determination module 408 includes any combination of hardware and/or software configured to determine positional information for an input object (e.g., input objects 140 of FIG. 1) based on the resulting signals received by receiver module 406. That is, determination module 408 is configured to demodulate the resulting signals to produce a first demodulated signal based on the first drive signal, and a second demodulated signal based on the second drive signal. Positional information for an input object is then determined based on the first and second demodulated signals.

Figure 5:
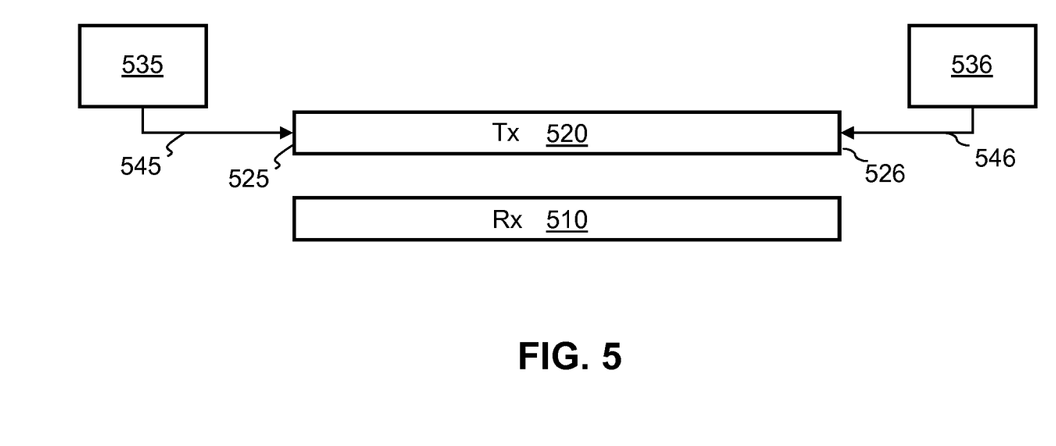
FIG. 5 is a conceptual diagram depicting an example of gradient sensor signaling.

FIG. 5 is a simplified block diagram depicting a transmitter electrode 520, a receiver electrode 510, a first transmitter 535, and a second transmitter 536 in accordance with one embodiment of the invention. In this embodiment, first transmitter 535 drives a first drive signal 545 that is used to drive end 525 of transmitter electrode 520, while second transmitter 536 substantially simultaneously drives a second drive signal 546 on end 526 of first transmitter electrode 520. "Driving" a signal with respect to a particular end of a transmitter electrode, as used herein, refers to imparting or otherwise causing a series of bursts, pulses or voltage transitions for a period of time. Transmitters 535 and 536 include any combination of hardware and/or software configured to drive signals as described herein. While transmitter electrode 520 and receiver electrode 510 are illustrated as generally rectangular and oriented substantially parallel to each other, the invention is not so limited: sensor electrodes 520 and 510 may have a variety of shapes and orientations.

In accordance with one aspect of the invention, drive signals 545 and 546 (which may be digital or analog) are mathematically independent of each other. As used herein with respect to drive signals 545 and 546, the term "mathematically independent" may refer to signals that provide meaningful independent results. For example, drive signals 545 and 546 may exhibit zero or low cross-correlation. That is, drive signals 545 and 546 may be considered "mathematically independent" even if the cross-correlation of the signals is not strictly zero, as long as the signals provide meaningful independent results. In one embodiment, the mathematically independent drive signals are orthogonal to each other. In other embodiments, the mathematically independent drive signals are substantially orthogonal to each other.

In some embodiments, drive signals 545 and 546 are mathematically independent in phase, as might be implemented in phase modulation (PM) systems. In some embodiments, drive signals 545 and 546 are mathematically independent in frequency. Examples include various frequency modulation (FM) schemes, such as orthogonal frequency-division-multiplexing (OFDM).

In other embodiments, drive signals 545 and 546 are mathematically independent in code. That is, a first code used for drive signal 545 is mathematically independent to a second code used for drive signal 546. In one embodiment, code divisional multiple access (CDMA) is implemented. In one embodiment, for example, drive signals 545 and 546 are pseudo-random sequence codes. In other embodiments, Walsh-Hadamard codes, m-sequence codes, Gold codes, Kasami codes, Barker codes, or other appropriate quasi-orthogonal or orthogonal codes are used to produce drive signals 545 and 546.

Referring to the plot shown in FIG. 5, while transmitter electrode 520 is driven by drive signals 545 and 546, a voltage gradient is instantaneously produced across transmitter electrode 520, and changes over time as drive signals 545 and 546 themselves change. In this regard, transmitter electrode 520 may be a substantially uniform resistive material, non-uniform resistive material, or may include geometrical features (narrow cross-sectional regions, or the like) that give rise to various shapes and amplitudes of voltage gradients. As with traditional gradient sensors, the position of an input object laterally along electrodes 510 and 520 may be determined based on the local change in capacitance induced by the proximity of the input object since at any particular time the nature of the voltage gradient is known.

The voltage variation can be a linear function; however, the invention is not so limited. The voltage variation may also be non-linear, piecewise linear, smooth (differentiable), non-smooth, or characterized by any other desired mathematical function. In some embodiments, the voltage variation is monotonic. In one embodiment, at a particular time, the voltage variation decreases from the first end 525 to the second end 526 of transmitter electrode 520 (i.e., V is inversely related to x).

Figure 6:
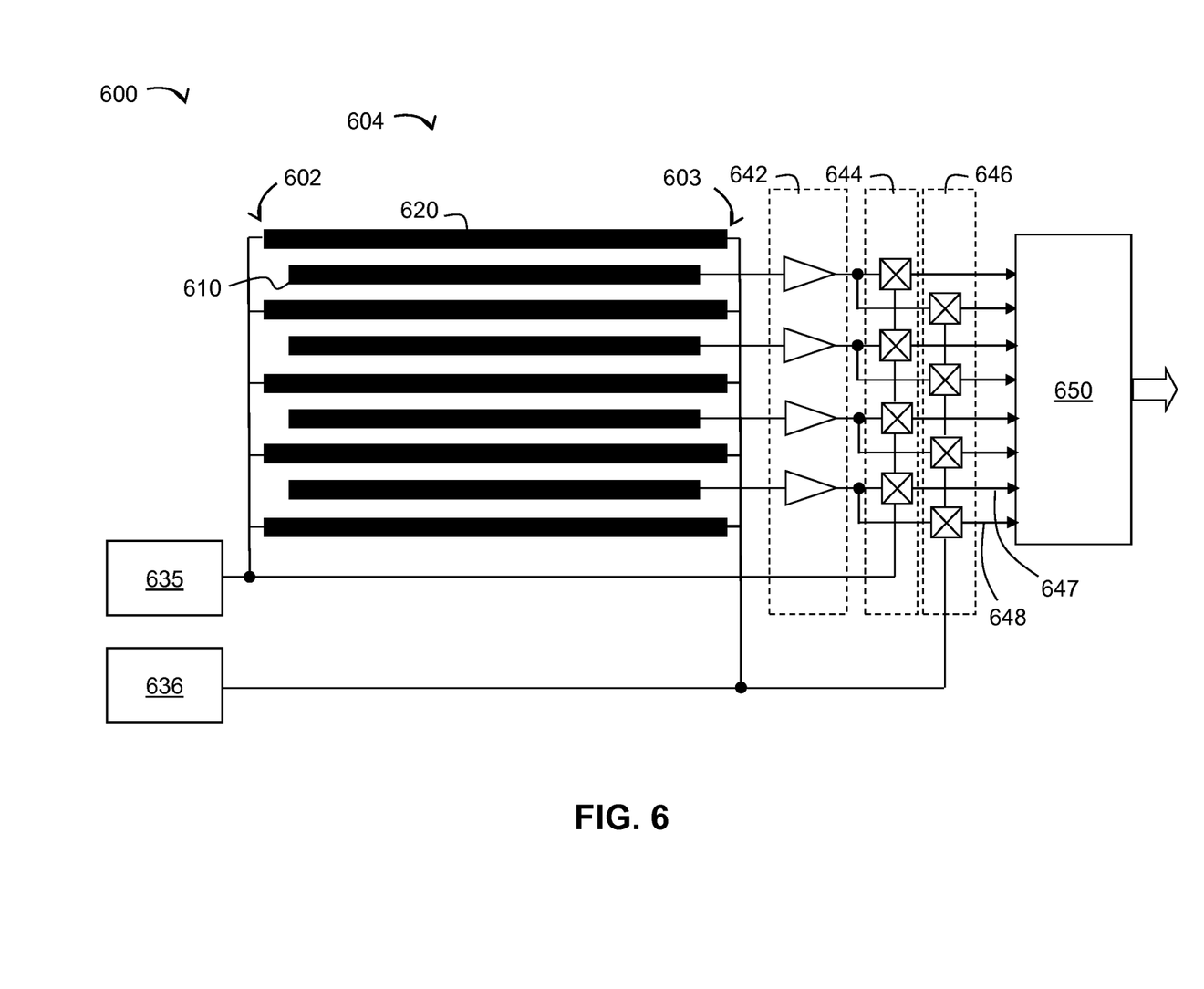
FIG. 6 is a block diagram depicting example circuitry in accordance with an embodiment of the invention.

FIG. 6 depicts example circuitry 600 in accordance with one embodiment suitable for implementing one or more of the modules depicted in FIG. 4. Circuitry 600 includes a plurality of transmitter electrodes 620 and a plurality of receiver electrodes 610 disposed substantially parallel to each other. For simplicity, only five transmitter electrodes 620 and four receiver electrodes 610 are illustrated. In other embodiments, a greater or lesser number of such electrodes are employed. According to various embodiments, transmitter electrodes 620 and receiver electrodes 610 are oriented such that they are not parallel to one another (e.g., are perpendicular). A first transmitter 635 is used to drive one end of each of the transmitter electrodes 620, while a second transmitter 636 is used to drive the opposite end of each of the transmitter electrodes 620. Circuitry 600 also includes a plurality of amplifiers 642, a plurality of first mixers 644, a plurality of second mixers 646, and a module 650.

Each receiver electrode 610 receives a resulting signal. The resulting signal is demodulated and further processed to enable positional information of an input object to be determined. According to various embodiments, a first mixer 644 can produce a first demodulated signal based on a first drive signal, and second mixer 646 can produce a second demodulated signal based on a second drive signal.

According to various embodiments, demodulation of a resulting signal is performed by providing the resulting signal and drive signal to a mixer. For example, each of the first mixers 644 can be coupled to the first transmitter 635. Similarly, each of the second mixers 646 can be coupled to the second transmitter 636. According to additional embodiments, a signal substantially equivalent to a drive signal can be provided to a mixer from a source other than transmitters 635 or 636.

Additional circuitry may be provided to perform additional operations. For example, amplifiers 642 can amplify the signal before demodulation, after demodulation, or as a part of the demodulation process. The outputs of mixers 644 and 646 may then be further processed by module 650 to produce positional information or the like. In some embodiments, module 650 includes a series of integrators (for integrating the mixer outputs), one or more analog-to-digital converters, and one or more digital processors.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:
   a transmitter module including a first transmitter and a second transmitter,
      wherein the first transmitter is configured to drive a first end of a transmitter electrode with a first drive signal comprising a first plurality of voltage transitions and the second transmitter is configured to drive a second end of the transmitter electrode with a second drive signal comprising a second plurality of voltage transitions,
      wherein the first drive signal and the second drive signal are configured to be driven simultaneously and to produce a voltage gradient across the transmitter electrode,
      wherein the first drive signal and the second drive signal are mathematically independent, and
      wherein the first drive signal is different from the second drive signal;
   a receiver module, the receiver module configured to receive a resulting signal with a receiver electrode, the resulting signal comprising effects of the voltage gradient; and
   a determination module configured to determine positional information for an input object based on the resulting signal.

2. The processing system of claim 1, wherein the first drive signal and the second drive signal are mathematically independent in at least one of frequency and phase.

3. The processing system of claim 1, wherein the first drive signal and the second drive signal are mathematically independent in code.

4. The processing system of claim 1, wherein the first drive signal and second drive signal are substantially orthogonal to one another.

5. The processing system of claim 1, wherein the first drive signal and second drive signal are orthogonal to one another.

6. The processing system of claim 1, wherein the transmitter electrode comprises a substantially uniform resistive material.

7. The processing system of claim 1, wherein the transmitter electrode and the receiver electrode are arranged substantially parallel or substantially perpendicular to one another.

8. A capacitive sensor device comprising:
   a transmitter electrode;
   a receiver electrode; and
   a processing system comprising a first transmitter and a second transmitter, wherein the processing system is communicatively coupled to the transmitter electrode and the receiver electrode, and wherein the processing system is configured to:
   simultaneously drive, using the first transmitter, a first end of a transmitter electrode with a first drive signal comprising a first plurality of voltage transitions and drive, using the second transmitter, a second end of the transmitter electrode with a second drive signal comprising a second plurality of voltage transitions to produce a voltage gradient across the transmitter electrode,
      wherein the first drive signal and the second drive signal are mathematically independent, and
      wherein the first drive signal is different from the second drive signal;

receive a resulting signal with a receiver electrode, the resulting signal comprising effects of the voltage gradient;

demodulate the resulting signal to produce a first demodulated signal based on the first drive signal, and a second demodulated signal based on the second drive signal; and determine positional information for an input object based on the first and second demodulated signals.

9. The capacitive sensor device of claim 8, wherein the first drive signal and the second drive signal are mathematically independent in at least one of frequency and phase.

10. The capacitive sensor device of claim 8, wherein the first drive signal and the second drive signal are mathematically independent in code.

11. The capacitive sensor device of claim 8, wherein the first drive signal and second drive signal are substantially orthogonal to one another.

12. The capacitive sensor device of claim 8, wherein the first drive signal and second drive signal are orthogonal to one another.

13. The capacitive sensor device of claim 8, wherein the transmitter electrode and the receiver electrode are disposed in a single layer on a common substrate.

14. The capacitive sensor device of claim 8, wherein the transmitter electrode and the receiver electrode are arranged substantially parallel or substantially perpendicular to one another.

15. A method of capacitive sensing, the method comprising:

simultaneously driving, by a first transmitter, a first end of a transmitter electrode with a first drive signal comprising a first plurality of voltage transitions and driving, by a second transmitter, a second end of the transmitter electrode with a second drive signal comprising a second plurality of voltage transitions to produce a voltage gradient across the transmitter electrode, wherein the first drive signal and the second drive signal are mathematically independent, and wherein the first drive signal is different from the second drive signal;

receiving a resulting signal with a receiver electrode, the resulting signal comprising effects of the voltage gradient;

demodulating the resulting signal to produce a first demodulated signal based on the first drive signal, and a second demodulated signal based on the second drive signal; and determining positional information for an input object based on the first and second demodulated signals.

16. The method of claim 15, wherein the first drive signal and the second drive signal are mathematically independent in at least one of frequency and phase.

17. The method of claim 15, wherein the first drive signal and the second drive signal are mathematically independent in code.

18. The method of claim 15, wherein the first drive signal and second drive signal are substantially orthogonal to one another.

19. The method of claim 15, wherein the first drive signal and second drive signal are orthogonal to one another.

20. The method of claim 15, wherein the transmitter electrode and the receiver electrode are arranged substantially parallel or substantially perpendicular to one another.

* * * * *